(12) United States Patent
Huber Lindenberger et al.

(10) Patent No.: US 11,499,843 B2
(45) Date of Patent: Nov. 15, 2022

(54) FLUX COUPLING TARGET

(71) Applicant: MELEXIS TECHNOLOGIES SA, Bevaix (CH)

(72) Inventors: Samuel Huber Lindenberger, Bevaix (CH); Javier Bilbao De Mendizabal, Bevaix (CH); Jan-Willem Burssens, Bevaix (CH); Wolfram Kluge, Bevaix (CH); Jorg Rudiger, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 181 days.

(21) Appl. No.: 16/963,136

(22) PCT Filed: Jan. 22, 2019

(86) PCT No.: PCT/EP2019/051438
§ 371 (c)(1),
(2) Date: Jul. 17, 2020

(87) PCT Pub. No.: WO2019/141849
PCT Pub. Date: Jul. 25, 2019

(65) Prior Publication Data
US 2021/0131829 A1 May 6, 2021

(30) Foreign Application Priority Data
Jan. 22, 2018 (EP) .................................... 18152822

(51) Int. Cl.
*G01B 7/14* (2006.01)
*G01B 7/30* (2006.01)
(Continued)

(52) U.S. Cl.
CPC ........... *G01D 5/2053* (2013.01); *G01B 7/003* (2013.01); *G01D 5/202* (2013.01); *G01D 5/2013* (2013.01); *G01D 5/2046* (2013.01); *G01B 7/023* (2013.01)

(58) Field of Classification Search
CPC .... G01D 5/2053; G01D 5/2013; G01D 5/202; G01D 5/2046; G01B 7/003; G01B 7/30; G01B 7/14; G01B 7/023
(Continued)

(56) References Cited

U.S. PATENT DOCUMENTS 5,804,963 A 9/1998 Meyer
6,236,199 B1 5/2001 Irle et al.
(Continued)

FOREIGN PATENT DOCUMENTS

EP 0909955 A2 4/1999

OTHER PUBLICATIONS

International Search Report and Written Opinion from PCT Application No. PCT/EP2019/051438, dated Mar. 28, 2019.
(Continued)

*Primary Examiner* — Raul J Rios Russo
(74) *Attorney, Agent, or Firm* — Workman Nydegger

(57) ABSTRACT

A target configured to be used with a position sensor for sensing a position of the target is described. The target includes at least one elongated conductive loop structure for allowing eddy currents to flow therein and configured to affect a magnetic field received from the position sensor in a preferred direction along the at least one elongated conductive loop structure.

17 Claims, 9 Drawing Sheets

(51) Int. Cl.
*H01F 5/00* (2006.01)
*G01D 5/20* (2006.01)
*G01B 7/00* (2006.01)
*G01B 7/02* (2006.01)

(58) Field of Classification Search
USPC ..... 324/51, 55, 200, 207.11, 207.13, 207.15, 324/207.16
See application file for complete search history.

(56) References Cited

U.S. PATENT DOCUMENTS

| | | |
|---|---|---|
| 6,259,249 B1 | 7/2001 | Miyata |
| 2003/0090424 A1* | 5/2003 | Brune ................. H01Q 1/04 343/866 |
| 2003/0136604 A1 | 7/2003 | Yamanaka et al. |
| 2005/0247484 A1* | 11/2005 | Brune ................. H01Q 7/00 175/45 |
| 2016/0313142 A1 | 10/2016 | Muehlfeld et al. |
| 2018/0340989 A1* | 11/2018 | Latham ................. H01F 5/04 |
| 2020/0348151 A1* | 11/2020 | Huber Lindenberger ................. G01R 33/0029 |
| 2021/0048316 A1* | 2/2021 | Kluge ................. G01D 5/2053 |

OTHER PUBLICATIONS

Extended European Search Report from corresponding EP Application No. EP18152822.5, dated Mar. 9, 2018.

\* cited by examiner

FLUX COUPLING TARGET

TECHNICAL FIELD

The current application concerns a target for position sensing, in particular for offset invariant sensing of the position of the target, by ease of magnetic flux coupling.

BACKGROUND

Sensors for measuring a magnetic field property of a magnetic field are often referred to as magnetic field sensors or magnetic sensors. These kinds of sensors have a broad field of use. Often, these kinds of sensors are used in combination with magnetized objects or objects which influence a magnetic field in one way or another. These objects are also often referred to as targets. The magnetic sensors measure at least one property of the magnetic field either emanated by the target, i.e. originating from the target itself, or influenced by the target. Based on the measured at least one magnetic field property, the position of the target is then determined, thereby more than one measured at least one magnetic field property may be combined or processed to determine the position of the target. Therefore, these sensors are also often called position sensors. The most common position sensors are thereby linear and angular position sensors. A linear position sensor determines the position of the target on a linear path relative to the sensor, whereas an angular sensor determines the angular orientation of such a target in the vicinity of the sensor. Furthermore, the sensors are also capable of determine a change in the position of the target, for example a motion of the object on a linear path or its rotation.

Lately, the position sensors must be capable of being integrated in a small packaging, such that only a very limited area can be used for the sensor elements performing the measurements. While the size of the sensor shrinks, the tolerances of the target position remain unchanged, i.e. their acceptable displacements relative to the sensor remain unchanged. This means the targets can still have a substantial offset as compared to the size of the area used for the sensor elements performing the measurements. Offset in this context refers to any displacement of the target in relation to the sensor, which leads to a wrong determination of the position of the target. Thereby, a displacement can refer either to a lateral offset of the target and the sensor, or to an angular offset of the target and the sensor. This offset may be caused due to mechanical tolerances or mechanical wear.

In particular, for inductive sensors this offset is problematic. Inductive sensors measure how the target affects a magnetic field emanated from inductive sensor and based on this measured effect determine the position of the target, as for example described in EP 0 909 955 A1. Hereby, a magnetic field is emanated from the inductive sensor, this emanated magnetic field induces eddy currents in the conductive target, which itself are associated with a magnetic field. Subsequently, either at least one property of this induced magnetic field itself is measured or how this magnetic field attenuates the magnetic field emanated from the inductive sensor, by measuring at least one property of superposition of the emanated magnetic field and the induced magnetic field. If the magnetic field emanated from the inductive sensor impinges on an expected area of the target, then either by calibration runs or by modeled results the expected effect the target has got on the emanated magnetic field is known and as such it is known which measurements are going to be expected. However, if the target is offset, then the magnetic field emanated from the inductive sensor impinges on a different area of the target, such that dependent upon the shape or form of the target and where the emanated magnetic field impinges a different magnetic field is induced. Since the offset is not predictable, it is not known which measurements are going to be expected. This in turn means the offset of the target leads to inaccurate position determination, since measurements are encountered, which are expected for other positions than the target is actually in. It can also be said that the position determination of such kind of sensors is not robust to offsets, i.e. is not offset invariant. For angular or linear position sensors this means, if the target's axis of rotation or path of movement is offset from the expected axis or expected path, the target position cannot be determined accurately, i.e. the determined position of the target deviates from the real position of the target. These target offsets require as such complex correction algorithms or correcting means, if such corrections are even possible. In any case, such corrections are limited to target offsets, which are small with respect to the dimensions of the sensor.

Hence, one of the objects of the current application is to overcome the disadvantages of the known prior art and to provide a target for improved position determination, wherein the target is invariant to target offsets. The offset invariant position determination becomes in particular important when the overall size of the sensor becomes smaller and therefore the offsets may be in the order of magnitude of the size of the sensor, respectively its sensor elements, because then offset corrections are nearly impossible.

SUMMARY

This object is solved by the target according to the independent claims of the current application.

The target according to the invention comprises at least one elongated conductive loop structure for allowing eddy currents to flow therein and configured to affect a magnetic field received from a position sensor in a preferred direction along the at least one elongated conductive loop structure.

An elongated loop structure may be formed by a wire or may be formed by a slit or recess within a conductive material. The wire respectively the slit or recess may have opposing sides, which are aligned with the elongation of the elongated loop structure. These sides may therefore be spatially separated from one another.

A wire may be formed to resemble an elongated loop and may be made out of conductive material. The loop may surround a spatial extend. The wire may be printed, plated, sputtered, soldered or etched on a non-conductive material. However, the person skilled in the art will also recognize that other techniques are encompassed to form the wire.

Furthermore, a slit or recess may resemble an elongated loop. A slit or recess may be punched or cut into a conductive material. Thereby, a slit in the target may extend from one side of the target to the opposite side. For example, the slit may be a hole in the target, wherein said hole has a depth of the entire thickness of the target. In other words, a slit may be configured in such a way that it penetrates the whole thickness of the body of the target. A recess, may extend from one side of the target to a point somewhere inside of the body of the target and does not extend to the opposite side of the target, i.e. a recess may be a hole in the target, wherein said hole has a depth smaller than the entire thickness of the target.

A magnetic field, respectively the gradient of the magnetic field, which impinges on the target causes eddy currents to flow along the at least one elongated conductive loop structure. Thereby, a magnetic field is generated, which attenuates the impinging magnetic field more in a first direction than in a second direction. It can also be said that the elongated conductive loop structure is a conductive element, providing a moduled conductivity in one direction and an essentially constant conductivity distribution in a second direction. Hence, the impinging magnetic field is attenuated more in the first direction than in the second direction. Thereby, the first and the second direction are preferably substantially perpendicular to one another. Furthermore, the first and second direction preferably span a plane, which is parallel to the spatial extend of the target. Due to the attenuation, the impinging magnetic field is deformed, wherein this deformation is in one preferred direction, namely along the at least one elongated conductive loop structure. It can also be said that the at least one elongated conductive loop structure cause the magnetic field lines of the impinging magnetic field to align with this preferred direction. This alignment is not changed if the target is offset, because an offset caused for example by a displacement of the target may not change how the at least one elongated conductive loop structure influences the course of the magnetic field lines of the impinging magnetic field. In other words, the target defines a target plane and due to the at least one elongated conductive loop structure arranged in this target plane, the target is translational invariant on at least one axis comprised in the target plane. This in turn means that even so the target is offset, the relative effect the target has got on the impinging magnetic field remains the same. As such, it can also be said that the effect the target has got on the impinging magnetic field is offset invariant. Hence, the target allows offset invariant position determinations.

Thereby, the preferred direction in which the target affects the impinging magnetic field may be only encountered at discrete rotations. Hence, it can also be said that the target is non-rotational invariant, respectively the shape or form of the target constituted by the at least one elongated conductive loop structure is non-rotational invariant. For example, if the target is used for angular position determination, the shape or form of the target may be non-rotational invariant with respect to a rotation of the target relatively to the sensor. If the target is used for linear position determination, the shape or form of the target changes with respect to a direction of an expected linear change of the position of the target relatively to the sensor. In any of these cases, non-rotational invariant means that, the shape form of the target as seen from a location of the sensor, may not be the same when the target is rotated about an axis in an arbitrary angle. As such, it can also be said the shape or form of the target given by the elongated conductive loop structure is anisotropic. An anisotropic target is characterized in that the shape or form of the target is different if it is viewed from different directions.

The target of the invention therefore for the first time allows to determine the linear or angular position of the target with a sensor in an offset invariant manner.

In one preferred embodiment of the invention, the target further comprises another at least one elongated conductive loop structure. This another elongated conductive loop structure may be formed alike to the other at least one elongated conductive loop structure of the target or may be formed differently. The at least two elongated conductive loop structures may be conductively coupled to form discrete structures of electrically conductive paths. Along these discrete paths eddy currents may flow. It can also be said that eddy currents may flow along quantized paths. The at least two elongated conductive loop structures may thereby, at least locally, have the same direction. Hence, the at least two elongated conductive loop structures at least locally deform an impinging magnetic field alike in the same preferred direction. The at least two elongated conductive loop structures can be formed by two wires shaped in a form of elongated loops, wherein these two elongated loops are conductively connected. Also, the at least two elongated conductive loop structures can be at least two slits or recesses in a conductive material forming at least two elongated conductive loop structures, which are conductively connected. The at least two elongated conductive loop structures may be spatially separated. The separation between the at least two elongated conductive loop structures may equidistant or gradually increasing in size. When the separation is equidistant and the loop width is constant, then the at least two elongated conductive loop structures form a target, which is non-rotational invariant with a 180° ambiguity. Hence, if the target is rotated by 180° the shape form of the target will be the same as for 0°. If the separation is gradually increasing in size and the loop width is constant, then the target is non-rotational invariant with a 360° ambiguity. Hence, if the target is rotated by 360° the shape or form of the target will be the same as for 0°. This can also be achieved by an equidistant separation, but an increasing loop width. As such the orientation and separation of the elongated conductive loop structures can be adapted to the sensing situation.

In one preferred embodiment of the invention, the target further comprises another at least one elongated conductive loop structure. This another elongated conductive loop structure may be formed alike to the other at least one elongated conductive loop structure of the target or may be formed differently. The at least one elongated loop structure and the another at least one elongated loop structure may be located spatially apart from each other in distinct planes. Thereby, the at least one elongated conductive loop structure may be arranged substantially in one plane and the another at least one elongated conductive loop structure may be arranged substantially in another plane. The planes may be substantially parallel and may be spatially adjacent to one another or separated from one another. It can also be said, that the target comprises several layers, wherein the different layers are constituted by the planes. Thereby, the elongated conductive loop structures within the planes and between the planes may be conductively coupled. However, it is also contemplated that the elongated conductive loop structures are only conductively coupled within the plane and no conductive coupling is present between the planes. The elongated conductive loop structures may be printed, plated, etched, sputtered or soldered onto a non-conductive material. This non-conductive material may then also be part of the target itself. The elongated conductive loop structures may thereby be also substantially planar. Furthermore, the elongated conductive loop structures may also be partially or fully integrated into the non-conductive material.

In one preferred embodiment of the invention, the target may have a planar shape. Thereby, the spatial extend in two dimensions may be greater than the spatial extend in the third dimension. For example, the target may be a thin sheath of conductive material, into which slits or recesses are punched or cut, which resemble elongated conductive loop structures around which eddy currents can flow and which in turn affect an impinging magnetic field in a preferred direction. It is however also possible that the elongated conductive loop structures of the target are arranged onto a non-conductive material. This non-conductive material may then also be part of the target itself. The elongated conductive loop structures may thereby be also substantially planar. Furthermore, the elongated conductive loop structures may also be partially integrated into the non-conductive material.

In one preferred embodiment of the invention, the elongated conductive loop structures of the target are mounted onto a moving part, which is not itself part of the target, but which position shall be determined based on the position of the target.

In one preferred embodiment of the invention, the elongated conductive loop structure of the target is made from a conductive material. For example, the elongated conductive loop structure of the target may be made at least partially from a conductive material, may comprise portions made at least partially from a conductive material. The conductive material may be a metal, in particular, a ferromagnetic metal. However, the person skilled in the art will also contemplate that other materials as metal may be used, which possess conductive properties.

In one preferred embodiment example, the target is used with a sensor which comprises at least two sensor elements. Thereby at least one sensor element may generate a magnetic field which impinges on the target. This sensor element may also be referred to as producing sensor element, generating sensor element, or transmitting sensor element. The target affects the magnetic field in a preferred direction. At least one other of the at least two sensor elements then receives the affected magnetic field and outputs a signal associated with the encountered magnetic field. The respective sensor element may also be referred to as receiving sensor element. It can also be said that the magnetic flux of the magnetic field generated by the at least one transmitting sensor element couples to the at least one receiving sensor element via the target.

In one preferred embodiment example, the target is used with a sensor which comprises at least three sensor elements. Thereby, the at least three sensor elements may be configured to switch their operational mode from producing a magnetic field to receiving a magnetic field. Hence, in one configuration at least one of the at least three sensor elements may produce a magnetic field whereas at least two other of the at least three receive the magnetic field. In another configuration two of the at least three sensor elements may produce a magnetic field, whereas another one of the at least three sensor elements receives the superposition of the respective magnetic fields affected by the target. In any case, the target affects the magnetic field or the superposition in a preferred direction, such that the magnetic flux coupling will be influenced. Since the target has a preferred direction in which this magnetic flux coupling is influenced, the position of the target can be determined based on the measurements of the at least one receiving sensor element, because these measurements give an indication of the magnetic flux coupling. Thereby, if two sensor elements generate each a magnetic field, each of the generated magnetic fields produces eddy currents within the target. These eddy currents will flow along paths defined by the elongated conductive loop structures. Thereby, some of these eddy currents may cancel out each other, whereas others will be strengthened dependent upon the difference between the magnetic fluxes of the at least two transmitting sensors. The produced eddy currents can as such be controlled by the at least two transmitting sensor elements and the difference of the magnetic fluxes of their generated magnetic fields. The superposition of the eddy currents induced in the target will produce a magnetic field, which influences the magnetic fields generated by the at least two transmitting sensor elements and as such the magnetic flux coupling between the at least two transmitting sensor elements and the at least one receiving sensor element.

In general, it can be said that the magnetic flux of the impinging magnetic field at the target generates eddy currents that will flow along paths defined by the elongated conductive loop structures of the target. Thereby, some of these eddy currents may cancel out each other, whereas others will be strengthened dependent upon the difference in geometry of the elongated conductive loop structures and/or the difference in magnetic fluxes going through each of the elongated conductive loop structures.

For example, if the target has got elongated conductive loop structures with the same inductance, the impinging magnetic field needs to exhibit a gradient, in order that the partially and/or purely induced eddy currents are not canceled out, whereas if the target has got elongated conductive loop structures with difference in inductance between adjacent elongated conductive loop structures, the magnetic field does not need to exhibit a magnetic gradient. As such, with the geometry of the elongated conductive loop structures and therefore the shape or form of the target, it can be accounted for different impinging magnetic field situations.

This can be exploited, for example in order to increase the eddy currents along the preferred direction of the elongated conductive loop structures. Hence, in turn increase the magnetic field produced by the eddy currents and as such increase the effect of the target. Thereby, it may be advantageously to avoid cancelation between eddy currents of adjacent elongated conductive loop structures, either by ease of a magnetic field with a gradient impinging on the target and/or by the geometry of the elongated conductive loop structures.

In general, it can be said that the magnetic flux coupling between at least one transmitting sensor element and the at least one receiving sensor element is affected, i.e. influenced, by the target and in particular the at least one elongated conductive loop structure. The at least one elongated conductive loop structure of the target may influence the magnetic field lines to align in a preferred direction. Hence, if the target is moved and at least one receiving sensor element lies within this preferred direction, the magnetic flux coupling between the at least one transmitting sensor element and the respective at least one receiving sensor element is the highest. This situation changes again, when the target is moved and as such the magnetic field is again affected differently. Based on the amount of measured property, for example induced voltage or current, at the at least one receiving sensor element, the position of the target can be determined, because the amount of the property measured at the at least one receiving sensor element gives a measure of the magnetic flux coupling. If the property is high, then the magnetic flux coupling is high, which in turn means the preferred direction of the target is aligned with a connecting line of the at least one transmitting sensor element and the at least one receiving sensor element. If the amount of the property is low, then the magnetic flux coupling is low, which in turn means the preferred direction of the target is not aligned with a connecting line of the at least one transmitting sensor element and the at least one receiving sensor element. The magnetic flux coupling can however also be differently exploited with more than two sensor elements. In an example of three sensor elements, one sensor element may be used as a transmitting sensor element and the other two may be used as receiving sensor elements. The magnetic flux coupling between the transmitting sensor element and each of the receiving sensor elements is then dependent on whether the preferred direction of the target lies in a direction of a connecting line, which spatially connects the transmitting sensor element and the respective one of the two receiving sensor elements. For example, if one of the receiving sensor elements, as seen from a location of the transmitting sensor element, lies within the preferred direction of the target, the magnetic flux coupling between the at least one transmitting sensor element and the respective at least one receiving sensor element is the highest, whereas the other one of the at least two receiving elements may not lie within the preferred direction and may encounter a weaker magnetic flux coupling, such that the at least two receiving elements will generate different output signals, for example different voltages or currents. Nevertheless, based on the property measured by the at least one receiving element, the position of the target can be determined. Besides only affecting the magnetic field, by influencing the direction or the orientation of the magnetic field lines, it may also be possible for the target to concentrate the magnetic field lines at a particular region, for example at the location of the at least one receiving sensor element. Further, it may also be possible for the target to push the magnetic field lines aside from a particular region. Thereby, it may be possible to reduce the number or the density of the magnetic field lines in the location of at least one of the receiving sensor elements.

In one preferred embodiment of the invention, when at least three sensor elements are used, then at least two of the at least three sensor elements of the sensor which may be used with the target may be pairwise opposing each other and the at least one other sensor element may be spatially distant to the at least two sensor elements. It can also be said that at least one point within the spatial extend of one of the two opposing sensor elements opposes a point within the spatial extend of the other of the two opposing sensor elements. Thereby, these points may for example be the centers of the two opposing sensor elements. For example, the points within the spatial extend of the two sensor elements may be located on a line, then a point within the spatial extend of the at least one other sensor element may be located with a particular distance to said connecting line. The particular distance of the at least one sensor element may lead to an arrangement of the at least three sensor elements in a triangular shape, i.e. if the particular distance is greater than zero. However, it is also possible that the particular distance may be zero, such that the one sensor element is also located on the line, which connects the at least two sensor elements. The at least three sensor elements may be spaced apart from one another, or may be adjacent to one another. It is also possible that the at least three sensor elements at least partially overlap each other.

In one preferred embodiment of the invention, at least one of the at least two sensor elements of the sensor which may be used with the target is arranged within a first plane and a surface of the target facing the at least one of the two sensor elements is located in a second plane, wherein the first and second plane have a particular distance to one another. Thereby, said distance of the second plane relatively to the first plane may be a distance at least partial in the direction of a normal vector of the first plane. Within the first plane also more than one sensor element may be arranged. For example, at least two sensor elements may be arranged in the first plane, whereas another sensor element may be arranged in a plane also distant from the first plane. This distance may be chosen so that this another plane is closer to the second plane as the first plane or may be further apart from the second plane as the first plane. The first and the second plane may be parallel with respect to each other.

In one preferred embodiment of the invention, at least a portion of the at least two sensor elements of the sensor which may be used with the target is configured to change its operational mode from generating a magnetic field to receiving a magnetic field and vice versa. However, it is clear to a person skilled in the art that the sensor elements may also possess an operational mode in which they are idle, hence neither generating nor receiving the magnetic field. Thereby, at least a portion of the sensor elements may refer to at least one sensor element, or all sensor elements, or an arbitrary number of sensor elements greater than one. In detail, the at least two sensor elements may be configured in a first operational mode such that, at a single point in time, at least one of the at least two sensor elements is generating a magnetic field and that at least one other one of the at least two sensor elements is receiving the magnetic field generated by the transmitting sensor element. In a second operational mode, at a subsequent point in time, the at least two sensor elements may change their operational modes such that, another one of the at least two sensor elements is generating the magnetic field while at least one other of the at least two sensor elements is receiving receive the generated magnetic field. It is clear to a person skilled in the art that the sensor elements, which in a first point in time operate in a first operational mode, do not need to change to the second operational mode in a second point in time. As such, all the sensor elements may have different operational mode cycles, which may be independent from the operational mode cycles of the other sensor elements. Although only at least two sensor elements are described, it is clear to a person skilled in the art that any number greater than two is encompassed. Furthermore, it is clear that the sensor elements may not only independently change their operational mode between receiving and transmitting, but may also change their sensitivity and/or the strength of the magnetic field they generate.

The change of operational mode may follow a particular operating cycle with a particular cycle time. This means the magnetic flux coupling between the at least one transmitting sensor element and the at least one receiving sensor element can not only be measured with one configuration, but actually with several configurations, such that more than one position determination can be performed. For example, if the cycle times are low in comparison to the change of the position of the target, the different measurements taken at subsequent points in time can be used to enhance position determination capabilities.

In one preferred embodiment of the invention, the at least one transmitting sensor element of the sensor which may be used with the target is configured to generate an alternating magnetic field. While each magnetic field is characterized by a north pole and a south pole, an alternating magnetic field is characterized by a change in the position of the north pole and the south pole. For example, the north and the south pole may fluctuate such that after a certain time, the north pole becomes the south pole while the south pole becomes the north pole. This fluctuation may be periodic and may be characterized by a periodic duration. This periodic duration may be the cycle time of the alternating magnetic field. Technically, the alternating magnetic field may be caused by driving the at least one transmitting sensor element with an alternating current or voltage. The generated magnetic field may be a symmetric magnetic field. It is clear to a person skilled in the art that in the same time instance, i.e. a fixed point in time with no duration, two transmitting sensor elements may produce the same or different alternating magnetic fields. For example, one transmitting sensor element may produce in one time instance a magnetic field, which north pole is facing the target, whereas in the same time instance a second transmitting sensor element is producing a magnetic field, which north pole is also facing the target, whereas in a second time instance both transmitting sensor elements produce each a magnetic field which south pole is facing the target. In this respect, it can also be said that the at least two transmitting sensor elements produce synchronized alternating magnetic fields. However, they can also produce both non-synchronized alternating magnetic fields. For example, one transmitting sensor element may produce in one time instance a magnetic field, which north pole is facing the target, whereas in the same time instance a second transmitting sensor element is producing a magnetic field, which south pole is facing the target, and vice versa in a second time instance.

In one preferred embodiment of the invention, the at least one transmitting sensor element of the sensor which may be used with the target is inductively coupled to the at least one receiving sensor element via the target. The target affects the emanated magnetic field, i.e. the target deforms the emanated magnetic field. The deformed emanated magnetic field is then measured by the at least one receiving sensor element. It can also be said that the effect the target has got on the emanated magnetic field is measured, such that by ease of this measurement the position of the target can be determined. The eddy currents induced within the target and their associated magnetic field are dependent upon the at least one elongated conductive loop structure of the target and how the eddy currents can flow within the target, which cause the emanated magnetic field to be deformed in a preferred direction. Because the target is non-rotational invariant, this preferred direction is only encountered at discrete positions of the target, such that the target's position can be determined based on the measurement of the deformation of the emanated magnetic field. Thereby, the deformed emanated magnetic field causes a signal to be outputted at the at least one receiving sensor element. The magnitude of this signal is dependent upon how the target and as such the preferred direction of the deformation of the emanated magnetic field is orientated relatively to the at least one receiving sensor element, such that the signal gives an indication of the orientation and as such the position of the target.

In one preferred embodiment of the invention, the sensor elements of the sensor which may be used with the target are implemented together with means for driving the at least one transmitting sensor element and/or with means for processing signals that are outputted by the at least one receiving sensor element. The means for driving the at least one transmitting sensor element may be configured to provide the at least one transmitting sensor element with an alternating current. The means for processing signals that are outputted by the receiving sensor elements may combine the signals, i.e. the current or voltage values, outputted by the receiving sensor elements. The combination may thereby be constituted by forming a difference and/or a sum of the respective signals. Furthermore, also other mathematical combinations may be performed, in order to output at least one signal indicative of the position of the target. For example a ratio may be formed. Furthermore, the means for processing may perform a comparison of the outputted signals of the respective receiving sensor elements and stored values. The stored values thereby may give an indication of values to be expected by the receiving elements for particular positions of the target. The stored values may thereby be stored during an initial calibration run or may be modeled results. The sensor may therefore also comprise means for storing. The means for storing may thereby store the values in a lookup table. The respective values may also be referred to as reference values. The means for processing may be a processing unit, an integrated circuit or an evaluation circuit. The means for driving the at least one transmitting sensor element and/or the means for processing and/or the means for storing may be implemented in one die or a molded package for a semiconductor chip.

The above-mentioned object is also solved by a system for sensing a position of a target, in particular for offset invariant sensing of the position of the target. Thereby, the system comprises at least two sensor elements, which may be referred to as a sensor, and a target, wherein at least one sensor element generates a magnetic field, wherein at least one other one of the at least two sensor elements receives the magnetic field, wherein at least one elongated conductive loop structure of the target affects a coupling of a magnetic flux of the magnetic field between the at least one transmitting sensor element and the at least one receiving sensor element.

BRIEF DESCRIPTION OF THE DRAWINGS

The following description and the annexed drawings set forth in detail certain illustrative aspects of the apparatus, the target, and the method described above. These aspects are indicative, however, of but a few of the various ways in which the principles of various embodiments can be employed and the described embodiments are intended to include all such aspects and their equivalent.

In the drawings, like reference characters generally refer to the same parts throughout the different drawings. The drawings are not necessarily to scale, emphasis instead generally being placed upon illustrating the principles of the invention.

Figure 1:
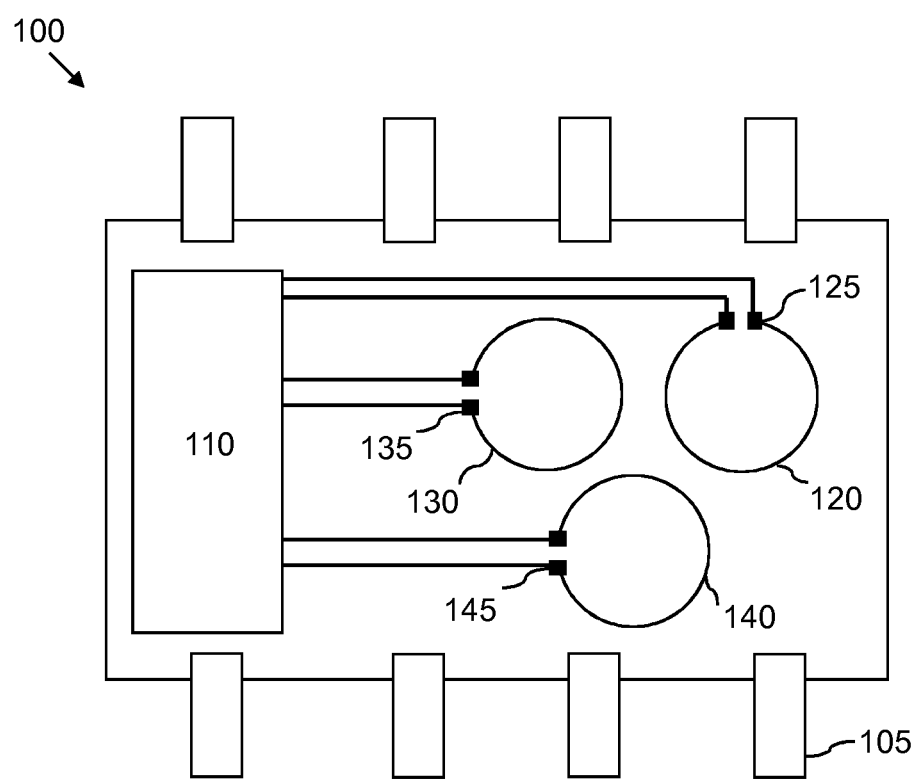
Figures 2A, 2B, 2C:
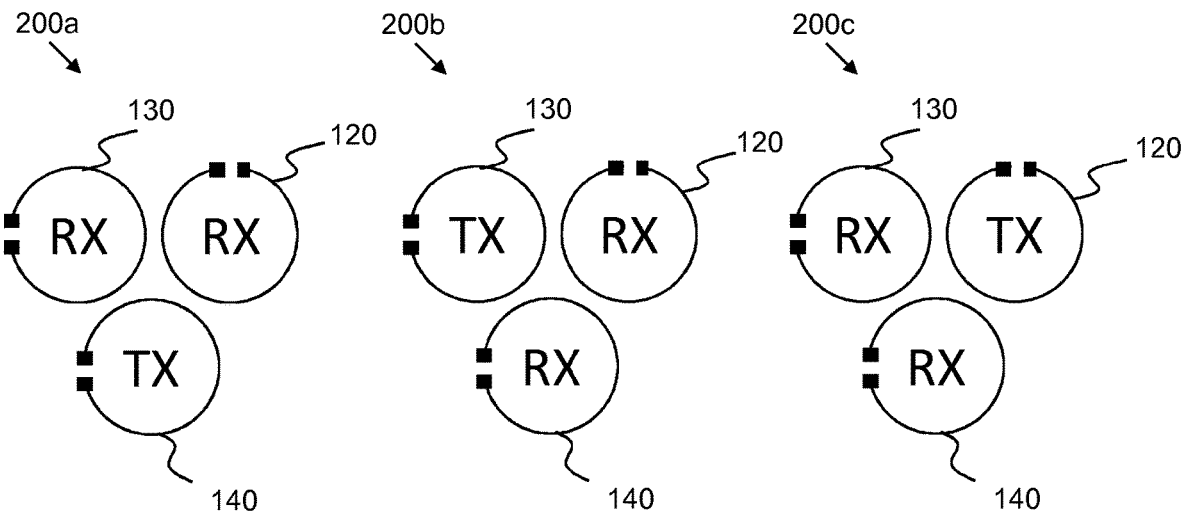
Figure 2D:
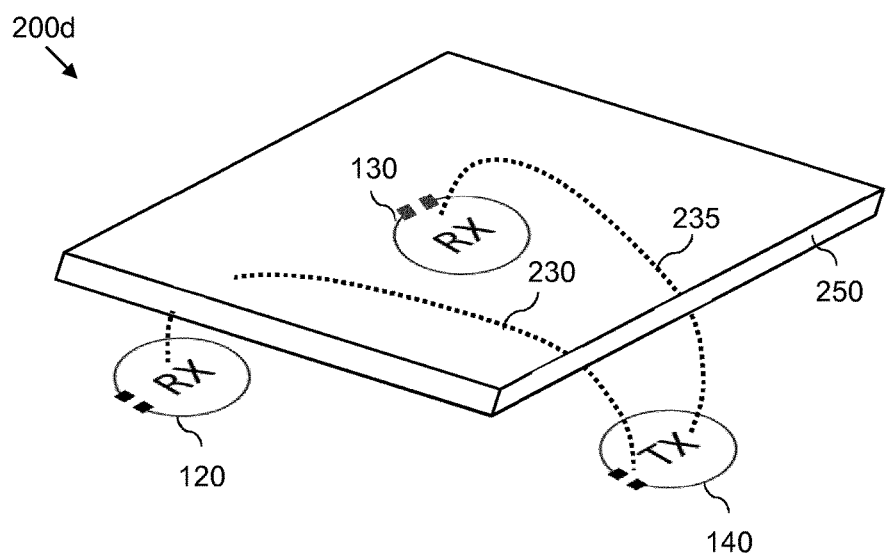
Figure 3A:
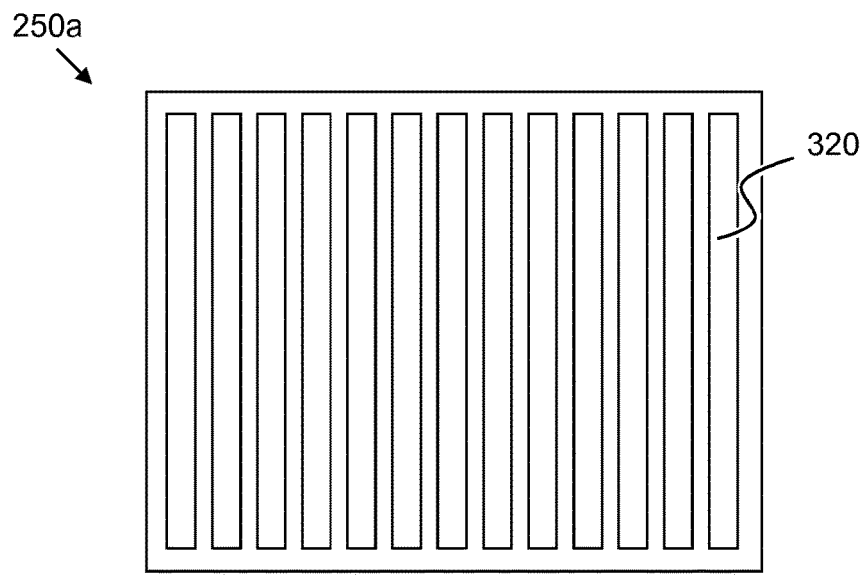
Figure 4A:
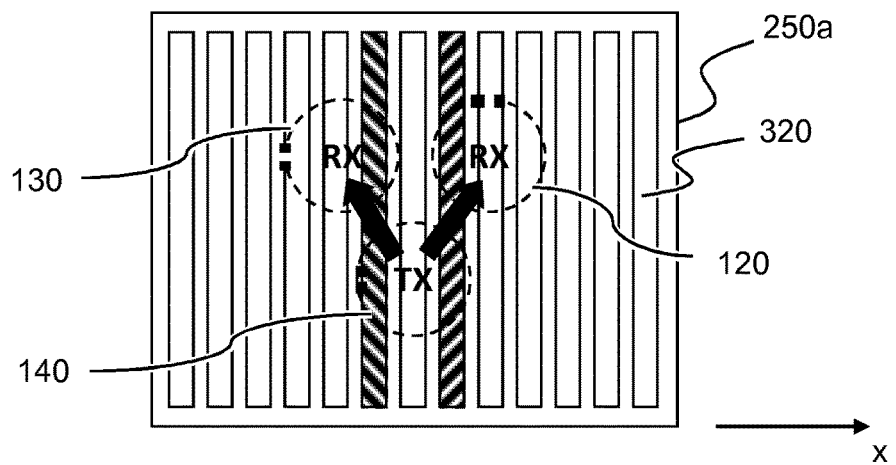
Figure 5A:
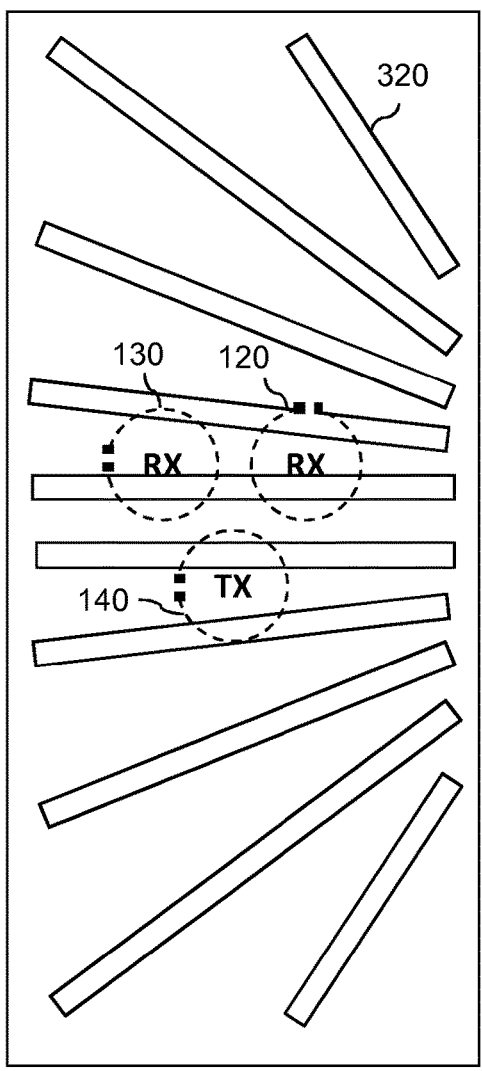
Figure 6:
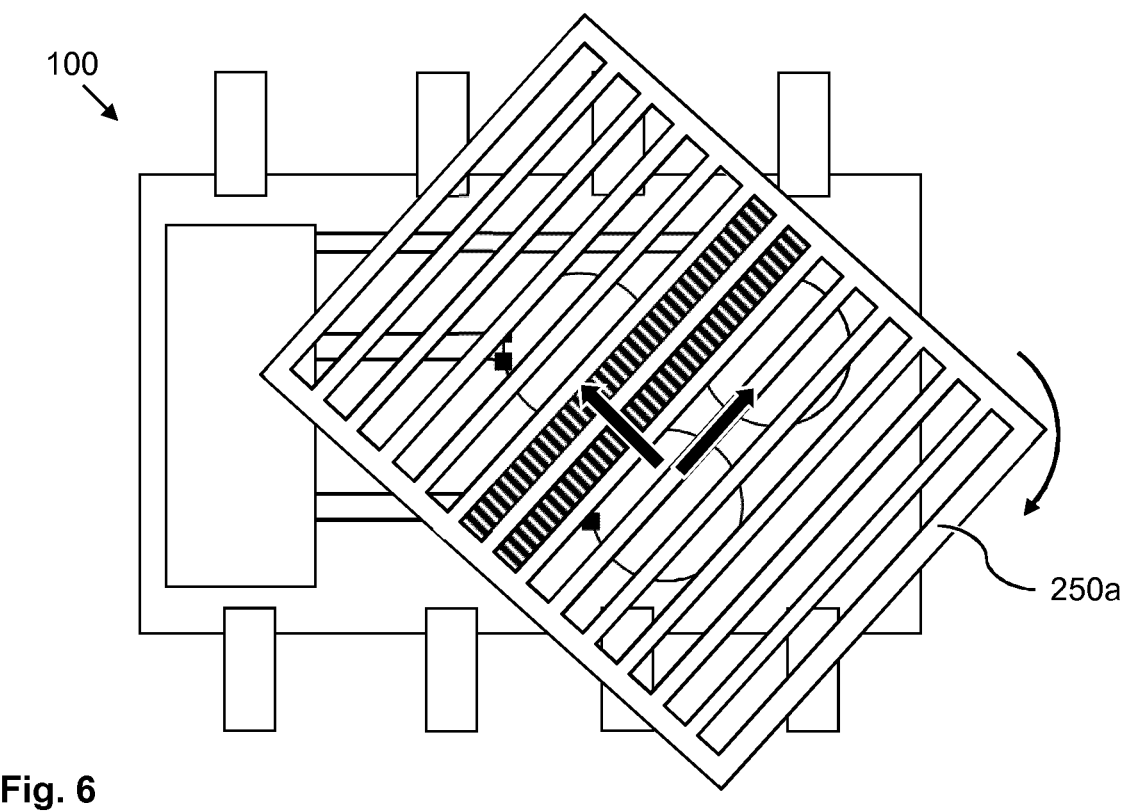
Figure 7:
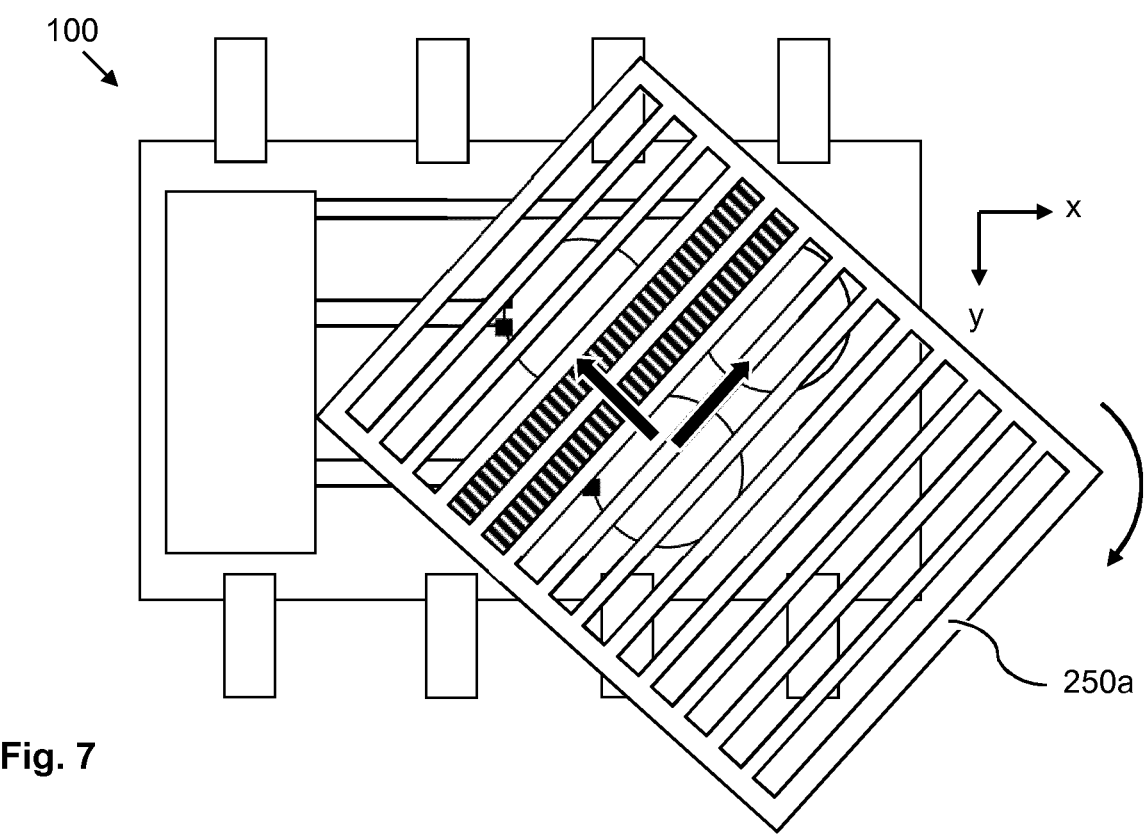

In the following description, various embodiments of the invention are described with reference to the following drawings, in which:

FIG. 1 shows a plan view of a generic sensor chip according to be used with a target according to the invention;

FIGS. 2a, b, c show exemplary operational modes of the sensor elements of the generic sensor chip shown in FIG. 1;

FIG. 2d shows a generic magnetic flux coupling between the sensor elements as shown in FIG. 2a and a target according to the invention;

FIGS. 3a to h show different embodiment examples of a target according to the invention;

FIGS. 4a, b, c, d, e show the target according to the embodiment example of FIG. 3a arranged on top of the sensor elements as shown in FIG. 2a in different angular positions;

FIGS. 5a, b show a different embodiment of a target according to the invention arranged on top of the sensor elements as shown in FIG. 2a;

FIG. 6 shows a plan view of the generic sensor chip of FIG. 1 and the target according to the embodiment example of FIG. 3a; and FIG. 7 shows the plan view of the generic sensor chip and the target of FIG. 6, wherein the target is offset to the arrangement of the generic sensor chip.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

FIG. 1 shows a plan view of a generic sensor chip 100. The sensor chip 100 can also be referred to as a sensor, a position sensor, an inductive sensor, or an inductive position sensor. The sensor chip 100 comprises an arrangement of sensor elements, here at least three sensor elements 120, 130, 140. The at least three sensor elements 120, 130, 140 in the here shown embodiment example do not overlap each other and are indicated by single coil loops. The person skilled in the art will however understand that any number of sensor elements equal or greater than two, namely one transmitting sensor element and one receiving sensor element is within the scope of the current invention. Furthermore, it is contemplated by the person skilled in the art that any kind of sensor element can be used, which is able to generate and/or receive a magnetic field. It is also contemplated that the sensor elements may be different kinds of sensor elements.

In the embodiment example shown in FIG. 1, each sensor element possesses contacts 125, 135, 145. Via these contacts 125, 135, 145, signals or information in general may be propagated from the sensor elements 120, 130, 140 to an optional determination unit 110. Furthermore, the contacts 125, 135, 145 may be used to provide the sensor elements 120, 130, 140 with an alternating current to generate a magnetic field or to drive the sensor elements in general.

A person skilled in the art will contemplate that even so in the here shown embodiment example the determination unit 110 is part of the sensor chip 100, this is only for illustrative purposes and the determination unit 110 can also be external to the actual sensor chip 100 or can be absent all together.

The sensor chip 100 may also comprise contacts 105, with which the sensor chip 100 can be connected to circuit boards and with which signals can be inputted and outputted from and to the sensor chip 100. Thereby, the contacts 105 can either be connected to the determination unit 110, or if the determination unit 110 is absent, the contacts 105 can be connected to the contacts 125 and 135.

FIGS. 2a, 2b, 2c, and 2b show exemplary different operational modes of the three sensor elements 120, 130, and 140 of the sensor chip 100 depicted in FIG. 1. Thereby, the three sensor elements 120, 130, 140 are further denoted "TX" and "RX". Thereby, "TX" indicates that the respective sensor element is generating a magnetic field, as such the sensor element denoted "TX" can also be named transmitting sensor element. The sensor elements denoted "RX" receive the magnetic field, as such the sensor elements denoted "RX" can also be named receiving sensor elements. Although the at least three sensor elements 120, 130, 140 may be configured to change their operational modes, it may also be possible that at least one sensor element of the at least three sensor elements 120, 130, 140 keeps its operational mode while the respective other sensor elements change their operational modes. Furthermore, it is contemplated that the different sensor elements may change their sensitivity and/or the strength of the magnetic field they produce.

In FIG. 2a sensor element 140 is the transmitting sensor element and sensor elements 120 and 130 are the receiving sensor elements. In FIG. 2b sensor element 130 is the transmitting sensor element and sensor elements 120 and 140 are the receiving sensor elements. In FIG. 2c sensor element 120 is the transmitting sensor element and sensor elements 130 and 140 are the receiving sensor elements. As shown in FIGS. 2a, 2b, 2c, the sensor elements 120, 130, 140 may at one point in time be the transmitting sensor element and at another point in time the receiving sensor element. Thereby, the operational mode of the sensor elements 120, 130, and 140 may be timely varied during operation of the sensor chip 100. A person skilled in the art will understand that the operational modes of the sensor elements 120, 130, and 140 may be varied arbitrarily. For example, the operation modes may be varied cyclicly, anticyclicly or in any kind of permutation, for example a random permutation. Also, the at least three sensor elements 120, 130, 140 may have an idle operational mode, in which they neither generate nor receive the magnetic field. Although in the here shown embodiment example, it is shown that at one point in time two sensor elements are the receiving sensor elements and one sensor element is the transmitting one, it is also possible that two sensor elements are transmitting sensor elements, whereas the remaining one is the receiving one. Since the sensor elements 120, 130, 140 are able to individually switch their operational modes, arbitrary combinations are possible.

Only for illustrative purposes and with no limiting implications, the following description assumes a sensor element configuration as depicted in FIG. 2a.

FIG. 2d shows a generic magnetic flux coupling between the sensor elements as shown in FIG. 2a and a target 250 according to the invention. The sensor elements 120, 130, and 140 together with the target 250 may form or may be referred to as a system. Thereby, the system comprises the three sensor elements 120, 130, 140 and the target 250. This system may also comprise the sensor chip 100 according to FIG. 1, which comprises the at least three sensor elements 120, 130, 140.

In FIG. 2d the target 250 is located above a plane in which the three sensor elements 120, 130, 140 are arranged. The target 250 is able of moving within this plane.

In the here shown embodiment example, sensor element 140 is the transmitting sensor element and sensor elements 120 and 130 are the receiving sensor elements.

The target 250 is configured to affect the magnetic flux coupling between the transmitting sensor element 140 and the receiving sensor elements 120 and 130. Thereby, the magnetic field emanated from the transmitting sensor element 140 causes eddy currents to flow within the target 250. The target 250, respectively at least one elongated conductive loop structure of the target 250 (here not shown), is thereby chosen as such, that the eddy currents flow in a predefined direction within the target 250. This causes the eddy currents to generate at least one directional magnetic field, which affects the magnetic field emanated by the transmitting sensor element 140. In detail, it deforms the course of the magnetic field lines of the emanated magnetic field. Hence, also the magnetic flux is affected. The resulting deformed magnetic field lines are roughly depicted by the dotted lines 230, 235 between the transmitting sensor element 140 and the respective receiving sensor elements 120, 130. In this case, the magnetic field lines, extend from the transmitting sensor element 140 to the respective receiving sensor element 120, 130, wherein they pass through the target 250.

The at least two receiving sensor elements 120, 130 receive the affected magnetic field, respectively encounter the affected magnetic flux, such that a current or voltage can be outputted by the two receiving sensor elements 120, 130. Hence, the at least two receiving sensor elements 120, 130 react to the transmitting sensor element 140, in such a way that the at least two receiving sensor elements 120, 130 are coupled to the at least one transmitting sensor element 140 via the target 250.

If the target 250 changes its position, the shape or form of the target 250 changes relatively to the magnetic field lines of the magnetic field generated by the transmitting sensor element 140, i.e. the magnetic field lines are differently affected, which in turn means the receiving sensor elements 120, 130 will encounter a different magnetic flux for different positions of the target 250.

For example, the at least one elongated conductive loop structure of the target 250 may align the magnetic field lines along a particular direction. If the transmitting sensor element 140 and at least one of the receiving sensor elements 120, 130 oppose each other along this particular direction, then the magnetic flux coupling between the transmitting sensor element 140 and the at least one of the receiving sensor elements 120, 130 is the highest. This means in turn, the respective receiving sensor element 120, 130 will measure a high induced current or voltage. The other respective receiving sensor element 120, 130, which does not oppose the transmitting sensor element 140 in the particular direction of the target 250 will encounter a lower magnetic flux. This means in turn, the respective receiving sensor element 120, 130 will measure a lower induced current or voltage. Since the induced currents or voltages measured by the receiving sensor elements 120, 103 are proportional to the amount of magnetic flux coupling, which is affected by the shape or form of the target 250, the respective currents or voltages allow a determination of the position of the target 250. In other words, different preferred directions are encountered at different positions of the target 250. Hence, at different positions of the target 250, different magnetic flux couplings between the transmitting sensor element 140 and the receiving sensor elements 120, 130 are encountered. This in turn means, different induced currents or voltages are encountered, from which the position of the target 250 can be determined. Thereby, the preferred direction in which the target 250 aligns the magnetic field lines is dependent upon the orientation of its at least one elongated conductive loop structure. Since the preferred direction of target 250 is only predominant in one direction, an offset of the target 250 does not substantially change the relative currents or voltages measured by the receiving sensor elements 120 and 130, since their position with respect to each other is fixed and the preferred direction of the target 250 is not changed. This means the offset of the target 250 has the same relative effect on the magnetic flux coupling and as such on the measured currents or voltages.

Different embodiment examples of the target 250 according to the invention are shown in FIGS. 3a to 3h. Thereby, the different embodiment examples of the target 250 have different elongated conductive loop structures, which in turn form different pattern and affect a magnetic flux coupling differently.

In FIG. 3a a target 250a is depicted, which is made out of a thin conductive material, which comprises a number of equidistant elongated slits 320. Hence, the slits 320 are arranged in parallel. A slit in the target 250a may extend from one side of the target 250a to the opposite side. For example, the slit 320 may be a hole in the target 250a, wherein said hole has a depth of the entire thickness of the target. Elongated in this context means that the slits 320 have a spatial extend in one direction, which is greater than their spatial extend in another direction, wherein the two directions are perpendicular to each other. It can also be said the slits 320 have a length and a width, wherein the lengths is greater than the width. The material surrounding the slits 320 represent conductive elongated loop structures, which are conductively connected. Hence, eddy currents induced in the target 250a by an impinging magnetic field can flow around the slits 320, generating a magnetic field, which affects the impinging magnetic field into the direction of the elongation of the slits 320. Even so in the here shown embodiment example a discrete number of slits 320 is shown, a person skilled in the art will recognize that any number of slits 320 may be possible. The target 250a has a non-rotational invariant pattern of elongated conductive loop structures with an ambiguity of 180°. Hence, if the target 250a is rotated from its position as shown in FIG. 3a by 180°, the same pattern will be encountered. As such, the target 250a has an ambiguity of 180°. It can also be said the pattern given by the slits 320 is mirror-symmetrically in two directions. Hence, the target 250a comprises a two-directional mirror symmetry.

Figure 3B:
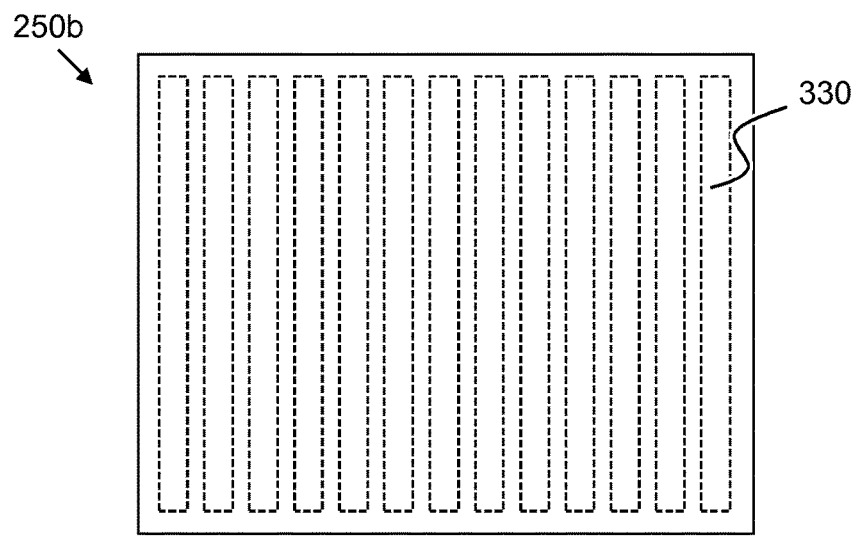

FIG. 3b shows a similar target 250b as shown in FIG. 3a, but instead of slits 320, the target 250b comprises a number of equidistant recesses 330, which are illustrated by ease of dashed lines. Also here, the recesses 330 are arranged in parallel. A recess 330 may extend from one side of the target 250b to a point somewhere inside of the body of the target 250b and does not extend to the opposite side of the target 250b. The material surrounding the recesses 330 represent conductive elongated loop structures, which are conductively connected. Hence, eddy currents induced in the target 250b by an impinging magnetic field can flow around the recesses 330, generating a magnetic field, which affects the impinging magnetic field into the direction of the elongation of the recesses 330. Even so in the here shown embodiment example a discrete number of recesses 330 is shown, a person skilled in the art will recognize that any number of recesses 330 may be possible. The target 250b has a non-rotational invariant pattern of elongated conductive loop structures with an ambiguity of 180°. Hence, if the target 250b is rotated from its position as shown in FIG. 3b by 180°, the same pattern will be encountered. As such, the target 250b has an ambiguity of 180°. It can also be said the pattern given by the recesses 330 is mirror-symmetrically in two directions. Hence, the target 250b comprises a two-directional mirror-symmetry.

Figure 3C:
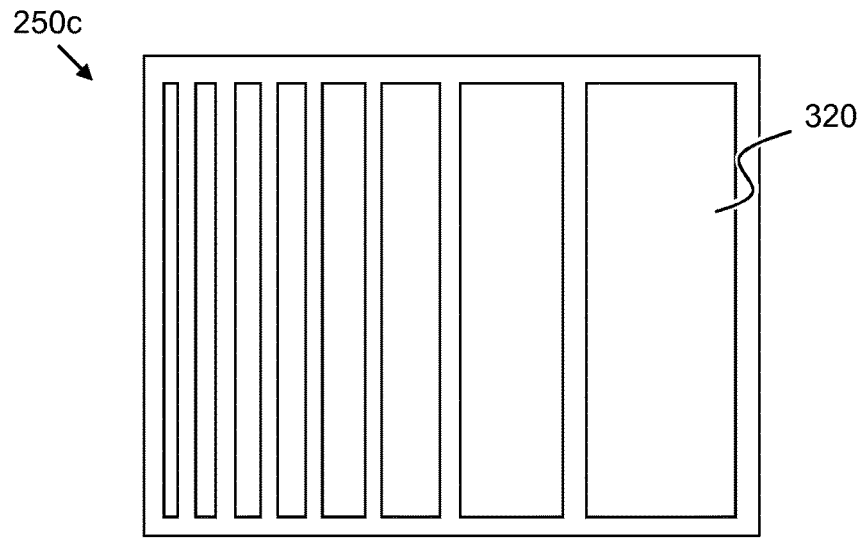

This 180° ambiguity of the targets 250a and 250b as shown in FIGS. 3a and 3b is remedied by the target 250c as shown on FIG. 3c. The target 250c as shown in FIG. 3c also comprises a number of elongated parallel slits 320, but with increasing width. In the here shown embodiment example, the width of the slits 320 increases from the outer left slit 320 to the outer right slit 320. Hence, also the size of the surrounding material, which represents the elongated conductive loop structures increases gradually in size. The elongated conductive loop structures however still affect an impinging magnetic field in a preferred direction. The target 250c as shown in FIG. 3c has an ambiguity of 360°, because the same pattern will only be encountered after a full 360° rotation. It can also be said the pattern given by the slits 320 is only mirror-symmetrically in one direction. Hence, the target 250c comprises a one-directional mirror-symmetry. Even so the target 250c is here depicted with slits 320, it is clear to a person skilled in the art that this target 250c may also comprise recesses instead.

Figure 3D:
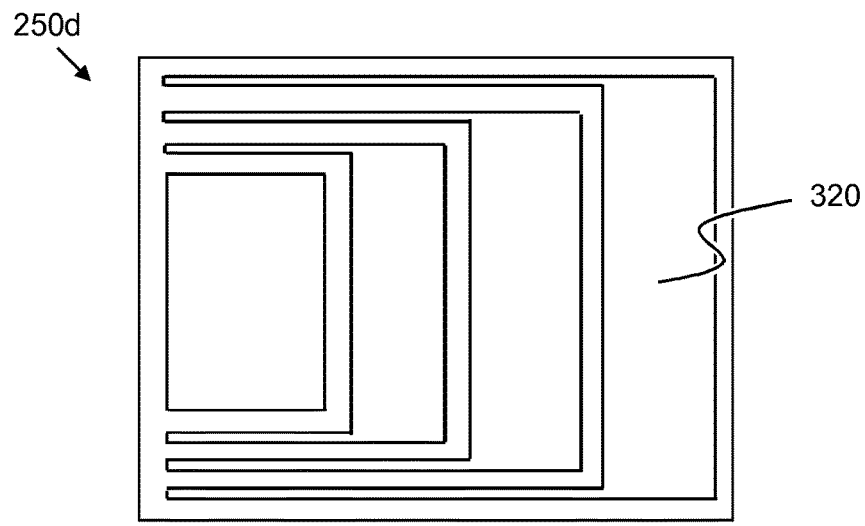
Figure 3E:
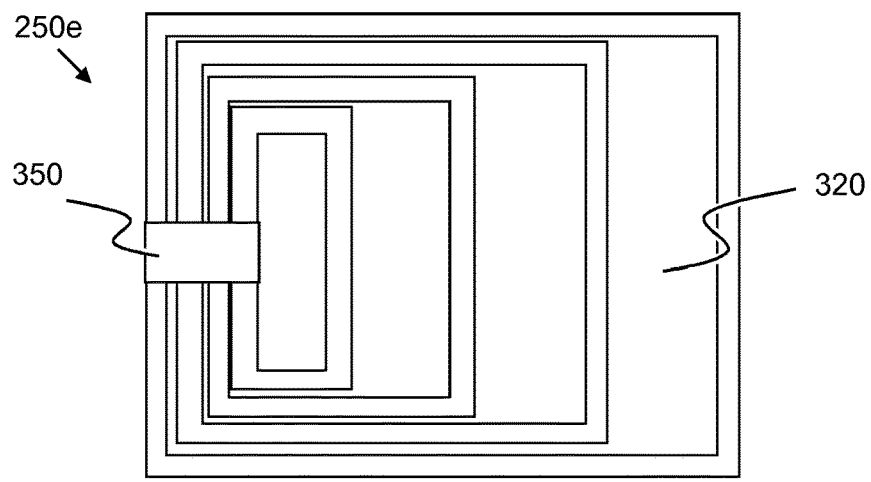

FIGS. 3d and 3e show different examples of target 250d and 250e comprising a one-directional mirror-symmetry. In the here shown embodiment examples, the elongated conductive loop structures form rectangular frames which each have a different size and are arranged into each other. The rectangular frames are thereby conductively connected to each other. Thereby, this conductive connection is either formed by letting the frames all share one common side or by a bridge 350 made out of conductive material. In another embodiment example, the bridge 350 may be made out of a non-conductive material, such that the non-conductive bridge isolates the elongated loop structures of the target 250e from one another.

Figure 3F:
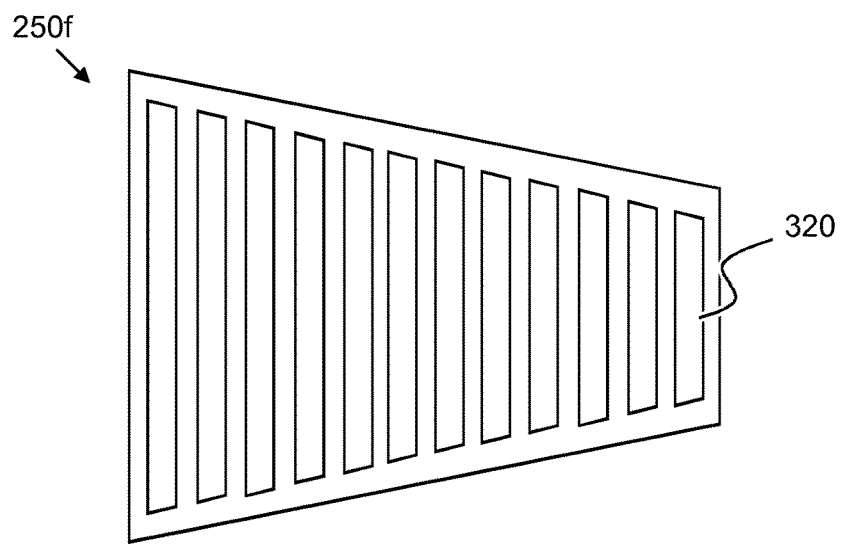

Another one-directional mirror-symmetric target 250f is shown in FIG. 3f. In the here shown embodiment example the slits 320 are arranged equidistant and parallel, but exhibiting different lengths. Thereby, the lengths of the slits 320 decrease from one side of the target 250f to the other. The material surrounding the slits 320 represents conductive elongated loop structures, which also decrease in lengths, such that the overall shape of the target 250f is trapezoidal. Hence, one side of the target 250f is longer than the opposing side.

It is clear to a person skilled in the art that even so concrete examples of targets 250a to 250f have been shown here, these targets 250a to 250f are only of an exemplary manner and are not intended to be limiting. Also other targets fall in the scope of the invention.

A person skilled in the art will also contemplate that targets with slits 320 and recesses 330 may be formed.

Figure 3G:
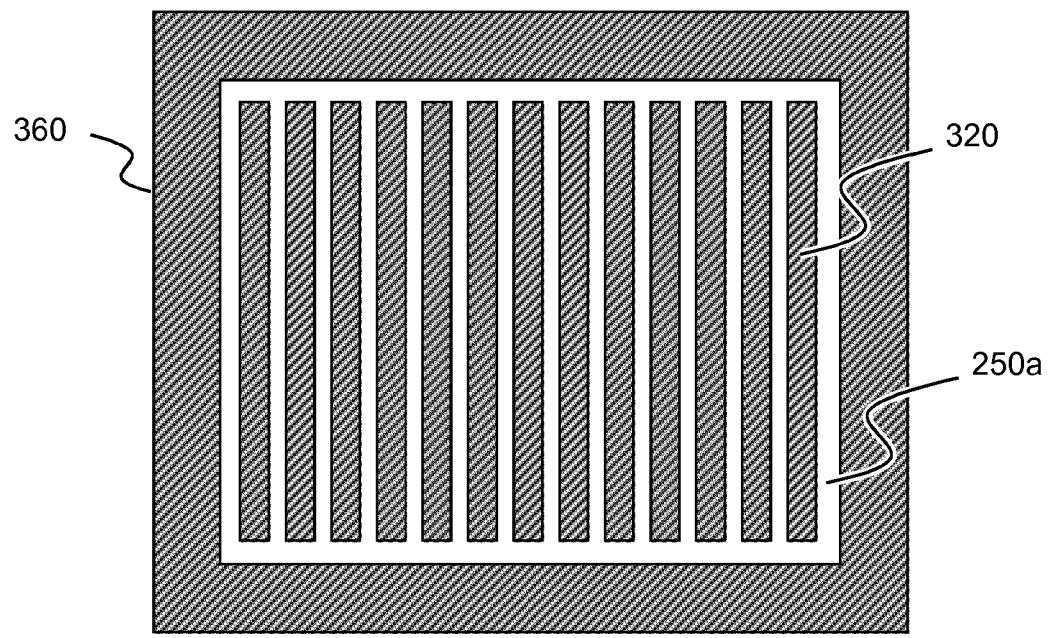
Figure 3H:
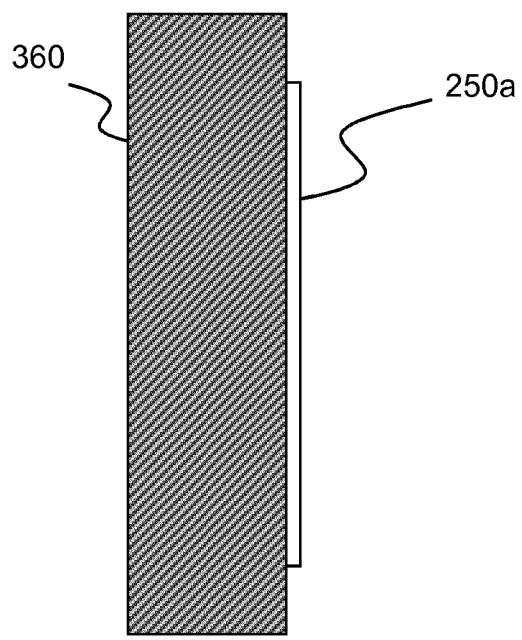

FIG. 3g shows the target 250a as shown in FIG. 3a mounted on a non-conductive material 360. FIG. 3h shows a slice through the respective target 250a and the non-conductive material 360. The target 250a may be glued on the non-conductive material 360 or may be printed onto the non-conductive material 360, for example like a printed circuit board (PCB). This non-conductive material may also be referred to as a carrier. The non-conductive material may be one of a plastic, a resin, or any other suitable non-conductive material.

Although the outer shapes of the targets 250a to 250f as depicted in FIGS. 3a to 3h are illustrated as being rectangular or trapezoidal, the outer shape of the targets 250a to 250f according to the invention are not limited to such shapes. The targets 250a to 250f may also have a shape of a triangle, a square, a diamond, a trapeze, a circle, an ellipse, an oval, or any other shape, which is suitable.

In some embodiments, it is also possible to use two targets at the same time. For example, two targets of the same type may be placed on top of each other while the targets are rotated relatively to each other. This allows for an enhanced number of patterns, which may be used for position sensing. For example, using two targets 250a would result in a pattern with interrupted slits 320 when the targets are rotated relatively to one another.

The targets 250a to 250f may have a size of 10 mm by 10 mm. The slits 320 or recesses 330 in the targets 250a to 250f may have a size of 0.3 mm by 0.9 mm. It is clear to a person skilled in the art that these sizes are only named for exemplary purposes and shall not be understood to be limiting. It is also clear that the shapes of the target may be different and only the area, where recesses and/or slits are formed, can have the aforementioned size.

The recesses 330 or slits 320 of the targets 250a to 250f may also be adapted to change their size and/or their orientation. For example, the slits 320 may be adapted to change their size and/or their orientation adaptively dependent on the movement of the targets 250a to 250f, i.e. during operations.

FIGS. 4a, 4b, 4c, 4d, and 4e show the target 250a as shown in FIG. 3a located above sensor elements 120, 130, 140 of the sensor chip 100 as shown in FIG. 1 in different angular positions.

The position of the target 250a as shown in FIG. 4a may be referred to as a neutral position, a baseline position or a zero position. In the embodiment example shown in FIG. 4a, a first side of the rectangular target 250a may be aligned with the axis x. Perpendicular to the axis x, the target 250a comprises the slits 320. When the sensor element 140 generates a magnetic field, the magnetic field lines of the magnetic field are affected by the elongated conductive loop structures of the target 250a, in detail by the magnetic field generated by the eddy currents induced within the target 250a, wherein the eddy currents flow around the slits 320 in the here shown embodiment example. This may result in an alignment of the magnetic field lines of the emanated magnetic field with the orientation of the slits 320. Consequently, the sensor elements 120, 130 experience a similar magnetic flux, when the target 250a is in the neutral position. Hence, both sensor elements 120, 130 will output merely the same current or voltage, due to the fact that they will encounter the same magnetic flux. In FIG. 4a, this magnetic flux coupling is represented by the broad black arrows, which connect the transmitting sensor element 140 and the respective receiving sensor elements 120, 130. This magnetic flux coupling has to pass one slit of the target 250a for receiving sensor element 120 and receiving sensor element 130. This is highlighted by the shaded slit 320.

In the here shown embodiment example the magnetic flux coupling takes place in a direction, which has a component parallel to a particular direction, namely along the non slited area, and a component perpendicular to said particular direction. The greater the perpendicular component is, the more will the magnetic flux, which is measured by the respective sensor element 120, 130, be reduced. In FIG. 4a, the perpendicular components are substantially equal for both of the receiving sensor elements 120, 130. The magnetic flux, which is encountered by the receiving sensor elements 120, 130, is therefore substantially the same. This in turn means, both receiving sensor elements 120, 130 will measure substantially the same induced current or voltage.

Figure 4B:
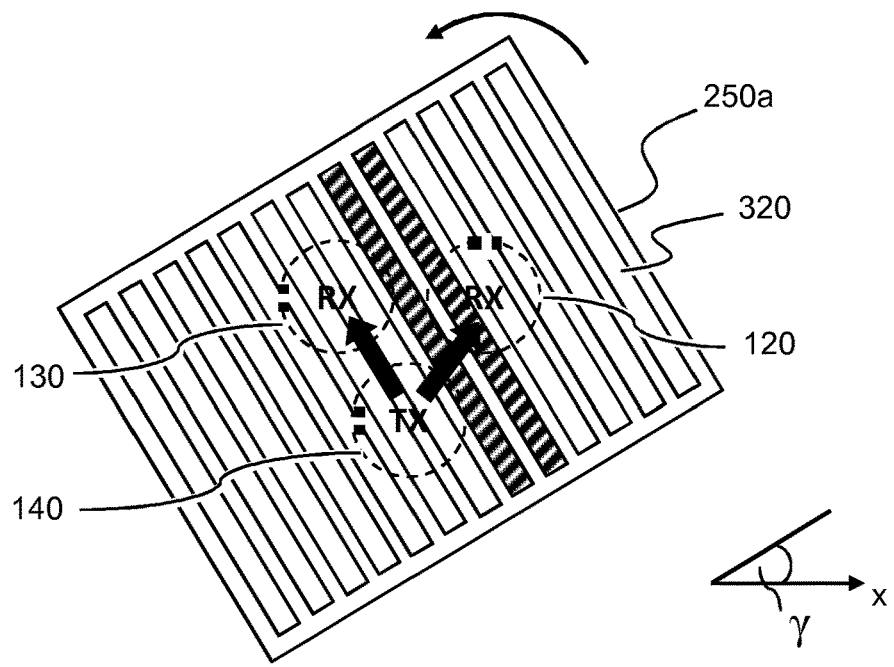

In FIG. 4b the same configuration as shown in FIG. 4a is shown, but the target 250a is rotated by an angle γ in the direction of the black curved arrow. In the here shown embodiment example, γ may be 30°. The resulting magnetic flux coupling, which is illustrated by the broad black arrows, is now different for the respective receiving sensor elements 120, 130. For receiving sensor element 130, the magnetic field lines, which are aligned with the direction of the slits 320, are also aligned with a connection line between the transmitting sensor element 140 and the receiving sensor element 130. As such, the direction of the magnetic flux coupling has a high component parallel to the preferred direction of the target 250a, while the perpendicular component is very low. The latter may be visualized by the fact that the broad black arrow, which illustrates the magnetic flux coupling, is aligned with the slits 320 for receiving sensor element 130. For the receiving sensor element 120, the direction of the magnetic flux, however, has a high component perpendicular to the preferred direction. This may be visualized by the broad black arrow passing two slits 320. This results in a difference in the magnetic flux, which is encountered by the respective receiving sensor elements 120, 130. This difference causes that the receiving sensor elements 120, 130 measure different induced currents or voltages. These different currents or voltages then allow to determine the position of the target 250*a*. In the here shown embodiment examples the different currents or voltages allow to determine the angle of the target 250*a* with respect to the sensor elements 120, 130, 140.

Figure 4C:
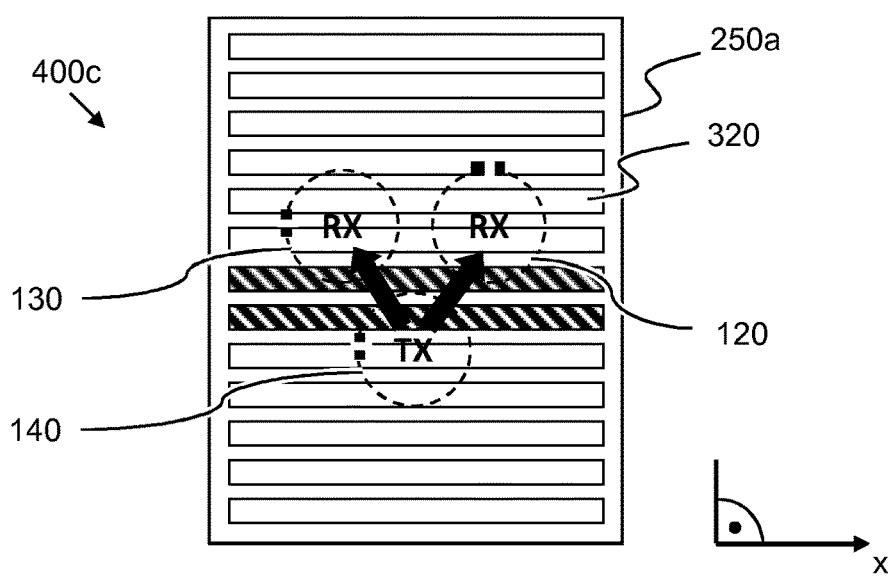

In FIG. 4*c* the target 250*a* is rotated by another 60°. In this case, both receiving sensor elements 120, 130 measure a reduced magnetic field of substantially the same magnitude. This is because the broad black arrows, which illustrate the magnetic flux coupling, have similar components parallel and perpendicular to the preferred direction. This in turn means that the measured induced currents or voltages of the receiving elements 120 and 130 are substantially the same again, but lower than the ones which are measured in the neutral position of the target 250*a* as depicted in FIG. 4*a*. The latter can be seen by the broad black arrows passing two slits 320 for each of the receiving sensor elements, 120, 130 in FIG. 4*c*, whereas the broad black arrows as depicted in FIG. 4*a* pass one slit 320 for each of the receiving sensor elements 120, 130.

If only the ratios of the induced currents or voltages measured at the respective receiving elements 120, 130 are compared between the positions of the target 250*a* as depicted in FIG. 4*a* and FIG. 4*c*, a rotation of the target 250*a* of only about 90° can be arbitrarily determined. This is because comparing the ratios of the currents or voltages of the receiving elements 120 and 130 will result in the same value for the position of the target 250*a* as depicted in FIG. 4*a* and FIG. 4*c*, since the receiving sensor elements 120 and 130 will both measure merely the same induced current or voltage values for both positions. However, if also the magnitude of the induced current and voltage values are accounted for, then also a rotation of the target 250*a* of about 180° can be arbitrarily determined.

This is due to the fact that the absolute value of the induced current or voltage is reduced for the position of the target 250*a* as depicted in FIG. 4*c* than compared to FIG. 4*a*. For example, even if for the target 250*a* the ratio of the measured induced currents or voltages between the receiving sensor elements 120 and 130 is the same for the angle of 0° (FIG. 4*a*) and 90° (FIG. 4*c*), the absolute value is different, because the target 250*a* is non-rotational invariant with respect to a rotation of about 90°. Hence, by accounting also for the magnitude of the measured induced currents or voltages an angular position of the target between 0° and 180° can be determined. As such it can be said target 250*a* has an ambiguity of 180°.

Figure 4D:
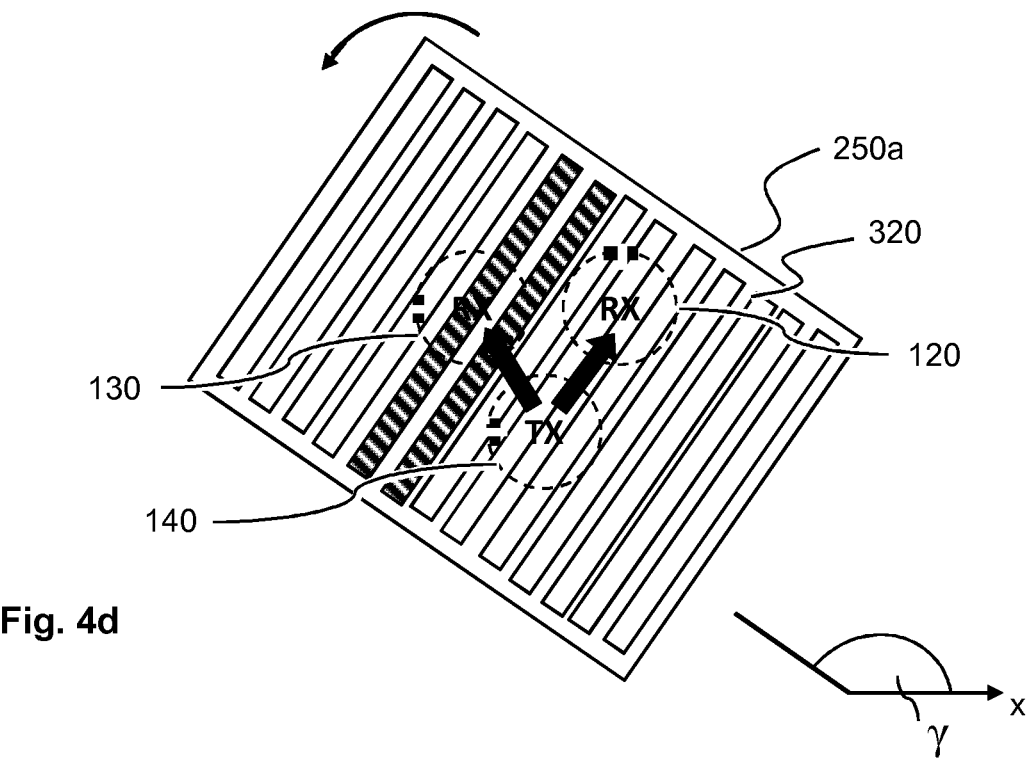

In FIG. 4*d* the target 250*a* is rotated by another 60°. The resulting magnetic flux coupling, which is illustrated by the broad black arrows, is again different for the respective receiving sensor elements 120, 130. Here the magnetic flux coupling between the transmitting sensor element 140 and the receiving sensor element 120 has a high component parallel to the preferred direction and a low perpendicular component, whereas the situation is vice versa for receiving sensor element 130. This difference causes that the receiving sensor elements 120, 130 measure different induced currents or voltages.

Figure 4E:
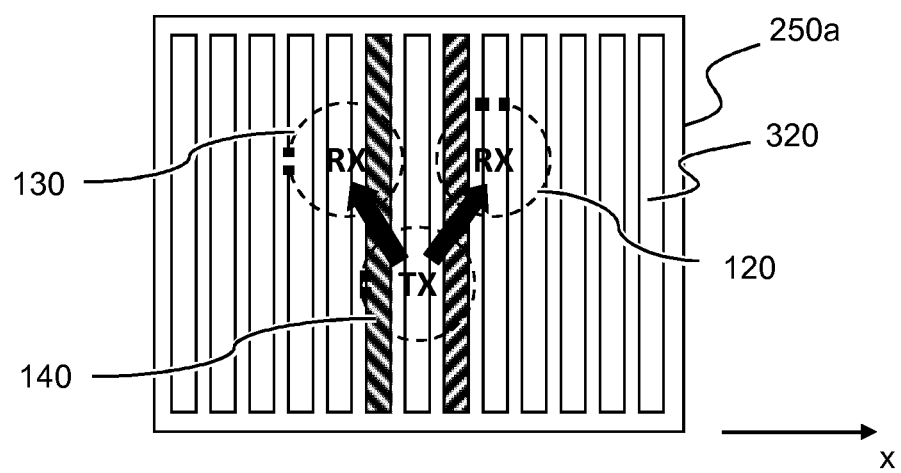

In FIG. 4*e* the target 250*a* is rotated by another 30°. It is clear to the person skilled in the art that the receiving sensor elements 120 and 130 measure substantially the same induced current or voltage, since the target 250*a* has been rotated by 180° and has as such substantially the same orientation and preferred direction of affecting the emanated magnetic field as in FIG. 4*a*. However, it may also be clear to the person skilled in the art that deviations and imperfections caused by the manufacturing process of the target 250*a* may prevent the target 250 from being absolutely symmetric with respect to a rotation of 180°.

If the operational mode of the transmitting and receiving sensor elements 120, 130, 140 is changed during the rotation, for example as depicted in FIGS. 2*a*, *b*, *c*, then for every angle between the neutral position and 360° can be determined. Furthermore, also by using different shapes or forms of the target, as shown in FIGS. 3*b* to 3*f* even without operational mode changing the range of the arbitrary position determination can be enhanced.

Figure 5B:
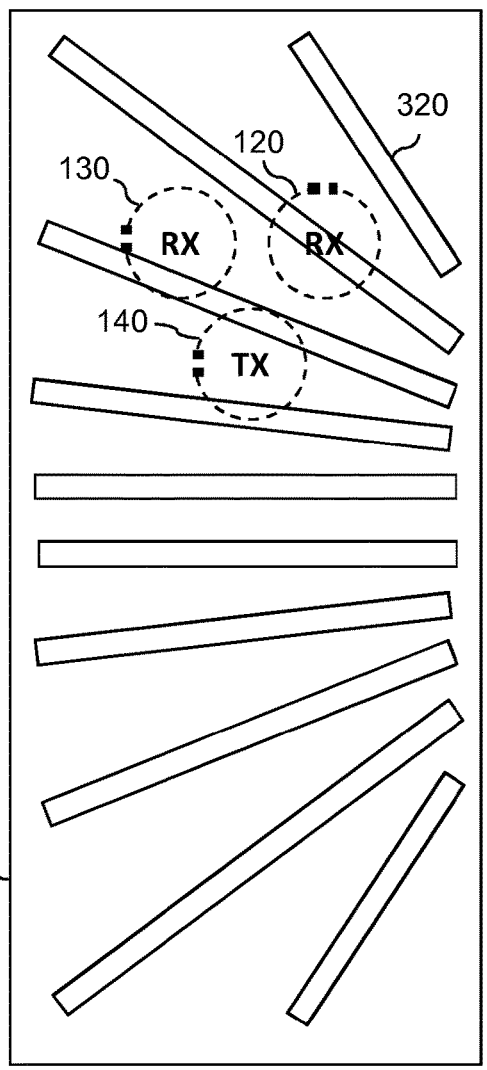

FIGS. 5*a* and 5*b* show another target 250*h* arranged over sensor elements 120, 130, 140 for a sensor chip as shown in FIG. 1.

In FIG. 5*a*, the target 250*f* is located in a first position, in which the sensor elements 120, 130, 140 are in the middle of the target 250*f*. This first position may also be referred to as a neutral position, a baseline position, or a zero position. However, in another embodiment of the invention, another position, for example a position at one of the end areas of the target 250*f*, may represent such a neutral, baseline, or zero position. However, in yet another embodiment, any other position in between the center and the one or two end areas of the target 250*f* may represent such a neutral, baseline or zero position.

In FIG. 5*b*, the target 250*f* is moved in a linear manner relatively to the sensor elements 120, 130, 140 in direction of the arrow into a second position.

Due to the fact that the slits 320 of the target 250*f* depicted in FIGS. 5*a* and 5*b* are tilted or angled with respect to one another, the linear movement of the target 250 relatively to the sensor elements 120, 130, 140 causes a change in the magnetic flux coupling of the transmitting sensor element 140 and the receiving sensor elements 120, 130. Because the slits 320 are angled with respect to one another, said linear movement causes the target 250*f* to affect the magnetic flux coupling similar to a rotational movement as described with respect to FIGS. 4*a*, 4*b*, 4*c*, 4*d*, and 4*e*. Therefore, it may be said that by using a target 250*f* with tilted or angled slits 320 for sensing a linear position, a linear motion of the target 250*f* relatively to the sensor elements 120, 130, 140 imitates an angular motion, by ease of the tilted or angled slits 320. Thereby, it can be said that each slit 320 defines locally another preferred direction of affecting the emanated magnetic field, because each slit locally defines an elongated conductive loop structure. Locally the target 250*f* therefore has a preferred direction, however over the target 250*f* area this preferred direction changes. The change is thereby dependent upon the angle between the slits 320. Hence, by moving the target 250*f* linearly over sensor elements 120, 130, and 140 for each position a new preferred direction is encountered, such that the position of the target 250*f* can be determined.

In FIG. 5*a* the magnetic flux coupling between the transmitting sensor element 140 and the receiving sensor elements 120 and 130 is merely equal, since the magnetic flux coupling for both receiving sensor elements 120 and 130 have the same parallel and perpendicular component as compared to the localized preferred direction. Hence, both receiving sensor elements 120 and 130 will merely measure the same induced currents or voltages.

In FIG. 5*b* the transmitting sensor element 140 and the receiving sensor element 130 lie within a localized preferred direction. Hence, the magnetic flux coupling between these sensor elements is high. Contrary to this, the connecting line between the transmitting sensor element 140 and the receiving sensor element 120 is substantially perpendicular to the localized preferred direction. Hence, the magnetic flux coupling of the transmitting sensor element 140 and the respective receiving sensor element 120 is reduced. Hence, the receiving sensor element 130 will measure a higher induced current or voltage than the receiving sensor element 120.

FIG. 6 shows a plan view of the sensor chip 100, which may be the sensor chip 100 depicted in FIG. 1, and the target 250*a* according to the embodiment example of FIG. 3*a*. As illustrated by ease of the curved arrow shown in FIG. 6, the target 250*a* is configured to rotate with respect to the sensor elements of the sensor chip 100, which determine the angular position of the target 250*a*.

FIG. 7 shows a plan view of the sensor chip 100 and the target 250*a* of FIG. 6, wherein the rotation axis of the target 250*a* is offset to the rotational axis as shown in FIG. 6. The offset is a translational offset in x- and y-direction.

The offset of the target 250*a* does not have a substantial effect on the operation of the sensor chip 100 according to the invention. As has been described herein, this is due to the fact that the magnetic flux coupling of the respective sensor elements is measured by the sensor elements instead of a magnetic field, which may be generated by the target 250*a* as known in the art. According to the invention, the elongated conductive loop structures of the target 250*a* affect the magnetic field lines and therefore affect the magnetic flux in a preferred direction. As evident from a comparison of FIGS. 6 and 7, the pattern of elongated conductive loops structures of the target 250*a* causes in the non-offset situation still the same magnetic flux coupling between the transmitting sensor element and the receiving sensor elements as in the offset situation, because this preferred direction is not changed due to an offset. Thereby, the magnetic flux coupling is indicated by the thick black arrows, as already explained in context of FIGS. 4*a-e*. Even if the target 250*a* is offset, the preferred direction remains unchanged, only the absolute values of the induced currents or voltages may be influences by the offset, but not the relative values, such that the offset does not degrade the determination capability.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims.

The invention claimed is:

1. A target configured to be used with a position sensor for sensing a position of the target, the target comprising:
a plurality of elongated conductive loop structures for allowing eddy currents to flow therein, each of the plurality of elongated conductive loop structures being elongated in an elongation direction and configured to affect a magnetic field received from the position sensor in a preferred direction along the plurality of elongated conductive loop structures,
wherein each of the plurality of elongated conductive loop structures are spatially separated by a respective separation, wherein the separation between adjacent ones of the plurality of elongated conductive loop structures gradually increases or decreases in size in a direction transverse to the elongation direction of the plurality of elongated conductive loop structures.

2. The target according to claim 1, wherein the plurality of elongated conductive loop structures includes a first elongated conductive loop structure wherein one side of the first elongated conductive loop structure is spatially separated from another side of the first elongated conductive loop structure.

3. The target according to claim 1,
wherein the plurality of elongated conductive loop structures includes a first elongated conductive loop structure and a second elongated conductive loop structure, wherein the first elongated conductive loop structure and the second elongated conductive loop structure are conductively coupled to form discrete electrically conductive paths.

4. The target according to claim 3, wherein the first elongated conductive loop structure and the second elongated conductive loop structure are spatially separated.

5. The target according to claim 3, wherein the first and the second elongated conductive loop structures are arranged to form a non-rotational invariant pattern.

6. The target according to claim 1,
wherein the plurality of elongated conductive loop structures includes a first elongated conductive loop structure and a second elongated conductive loop structure,
wherein the first elongated conductive loop structure is arranged in a first plane and the second elongated conductive loop structure is arranged in a second plane, the first plane being distinct from the second plane.

7. The target according to claim 1, wherein the magnetic field affected is an alternating magnetic field.

8. The target according to claim 1, wherein the target has a planar shape.

9. The target according to claim 1, wherein the target is entirely made of a conductive material.

10. The target according to claim 1, wherein the target is made of a non-conductive material and the plurality of elongated conductive loop structures is made of a conductive material.

11. The target according to claim 9, wherein the plurality of elongated conductive loop structures is printed, edged, glued, or soldered on the non-conductive material.

12. The target according to claim 1, wherein the separation between adjacent ones of the plurality of elongated conductive loop structures gradually increases or decreases in size in a direction perpendicular to the elongation direction of the plurality of conductive loop structures.

13. The target according to claim 1, wherein each of the plurality of elongated conductive loop structures respectively has a loop width, and
wherein the loop widths of the plurality of elongated conductive loop structures gradually increase or decrease in size in a direction transverse to the elongation direction of the plurality of elongated conductive loop structures.

14. The target according to claim 1, wherein each of the plurality of elongated conductive loop structures respectively has a loop length extending in a direction parallel to the elongation direction, and
wherein the loop lengths of the plurality of elongated conductive loop structures change in size in the direction transverse to the elongation direction of the plurality of elongated conductive loop structures.

15. The target according to claim 1, wherein the plurality of elongated conductive loop structures includes a first elongated conductive loop structure and a second elongated conductive loop structure, and wherein the first elongated conductive loop structure is angled with respect to the second elongated conductive loop structure such that the elongation direction of the first elongated loop structure is non-parallel to the elongation direction of the second elongated loop structure.

16. A target configured to be used with a position sensor for sensing a position of the target, the target comprising:

a plurality of elongated conductive loop structures for allowing eddy currents to flow therein, each of the plurality of elongated conductive loop structures being elongated in an elongation direction and configured to affect a magnetic field received from the position sensor in a preferred direction along the plurality of elongated conductive loop structures, wherein each of the plurality of elongated conductive loop structures respectively has a loop width in a direction transverse to the elongation direction, and wherein the loop widths of the plurality of elongated conductive loop structures gradually increase or decrease in size in the direction transverse to the elongation direction of the plurality of elongated conductive loop structures.

17. The target according to claim 16, wherein the respective loop widths of the plurality of elongated conductive loop structures gradually increase or decrease in size in a direction perpendicular to the elongation direction of the plurality of elongated conductive loop structures.

* * * * *